Aug. 31, 1954
W. E. SAXE
2,687,799
TROUGHING ROLLER STANDARD
Filed Jan. 3, 1949
2 Sheets-Sheet 1
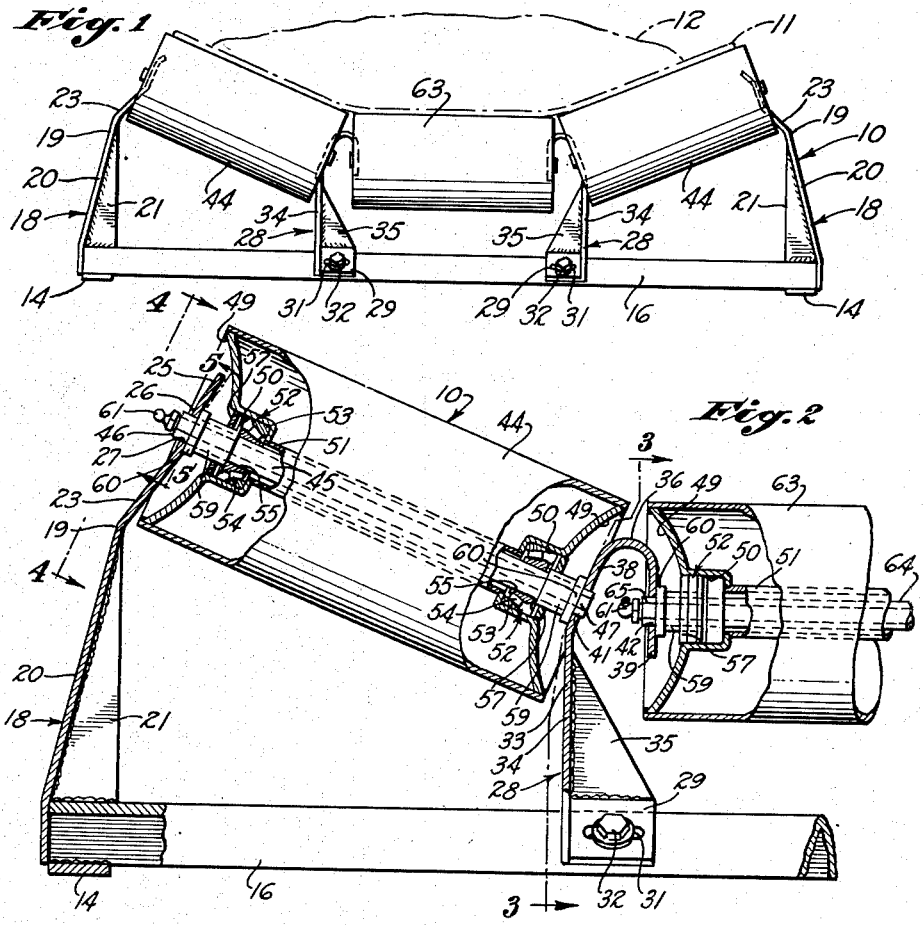
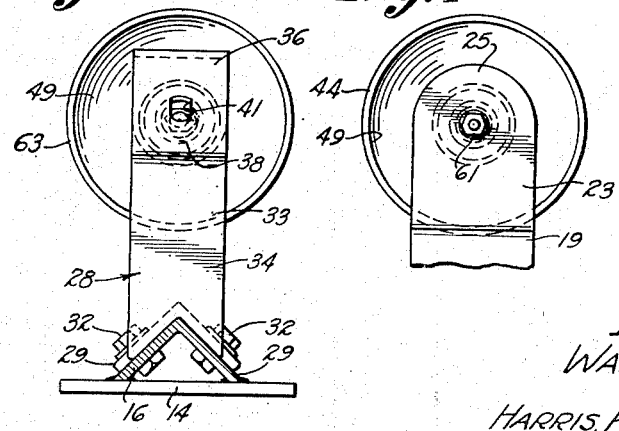
INVENTOR:
WALTER E. SAXE
BY HIS ATTORNEYS
HARRIS, KIECH, FOSTER & HARRIS
By Aug. 31, 1954   W. E. SAXE   2,687,799
TROUGHING ROLLER STANDARD
Filed Jan. 3, 1949   2 Sheets-Sheet 2
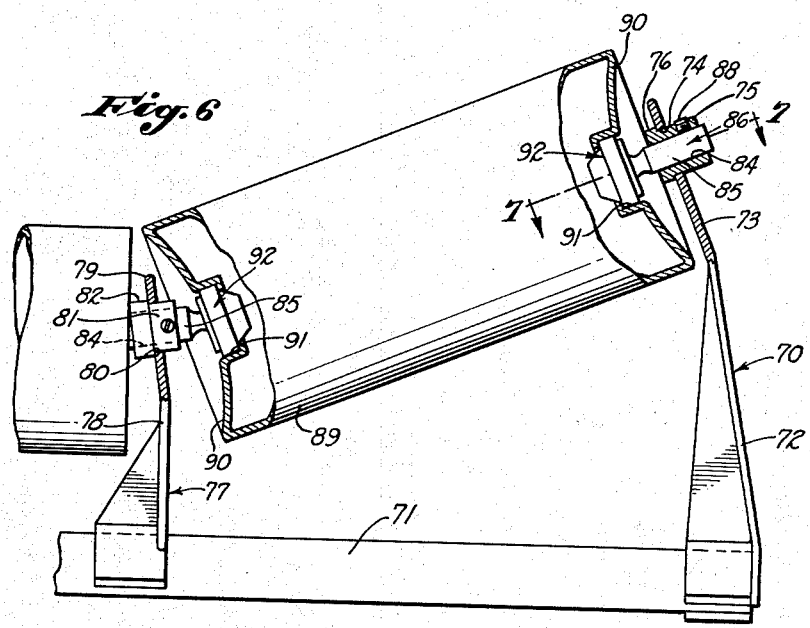
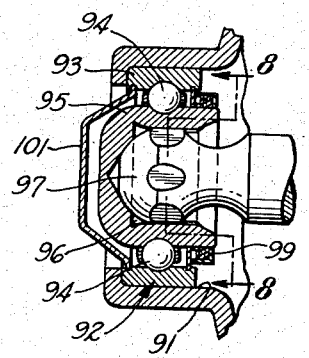
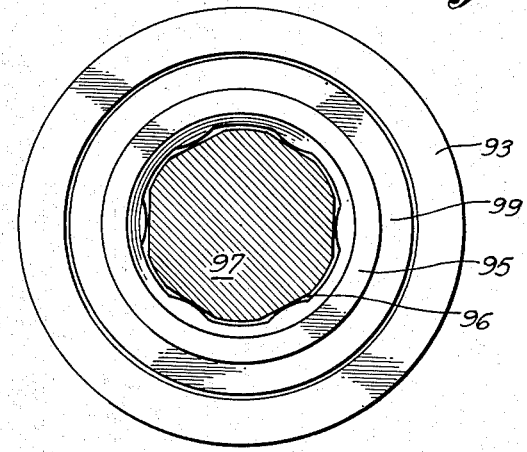
INVENTOR:
WALTER E. SAXE
BY HIS ATTORNEYS
HARRIS, KIECH, FOSTER & HARRIS
By Ward D. Foster Patented Aug. 31, 1954

2,687,799

UNITED STATES PATENT OFFICE 2,687,799

TROUGHING ROLLER STANDARD

Walter E. Saxe, Pasadena, Calif., assignor to The Conveyor Company, Inc., Los Angeles, Calif., a corporation of California Application January 3, 1949, Serial No. 68,905

16 Claims. (Cl. 198—192)

This invention relates to improvements in supports and, more particularly, to improvements in standards adapted to support a plurality of rotatable, load-bearing members in cooperative relationship with each other.

In order clearly to illustrate the manner of construction and mode of operation of my invention, I have described it as being embodied in standards adapted to support a plurality of rotatable, idler rollers which, in turn, are adapted to support a conveyor belt. It should be obvious, however, that my invention may be applied with equal facility to other rotatable members and I, therefore, do not intend that the illustrative embodiments thereof be taken in a limiting connotation.

Idler rollers of the type under consideration are usually mounted upon non-rotating shaft means which, in turn, are supported by rigid standards, the lower ends of which are suitably fixed to a transverse base member. In order to permit the idler rollers to revolve more easily and to reduce shaft wear, bearing members are usually between the ends of the rollers and the shafts upon which the rollers are mounted. Since thrust bearings are usually utilized, it is necessary to provide adjustment means for such bearings which will permit them to be properly adjusted when they are installed upon the shafts in the ends of the rollers. Such bearings are frequently initially adjusted at the factory where the idler assembly is manufactured and the wear attendant upon the continued use of the idler assembly and the lack of subsequent adjustment cause the bearings to become maladjusted and such maladjustment results in the failure of the bearings.

It is, therefore, a primary object of my invention to provide a standard for supporting rotatable load-bearing members, such as roller idlers, which has embodied therein resilient means adapted to automatically adjust the thrust bearings upon which the members are mounted and which is also adapted to keep the bearings in a maximum state of adjustment during their useful life. In this manner conveyor shut-down due to bearing failures may be eliminated and the expensive maintenance work involved in the replacement of worn-out bearings may be greatly curtailed.

It is an associated object of my invention to provide a standard structure for supporting idler rollers which is adapted to maintain the bearings upon which the rollers are mounted in an optimum condition of adjustment and to thus eliminate the frictional drag which tends to reduce the conveyor belt speed when conventionally adjusted thrust bearings begin to wear due to lack of proper adjustment.

When conventional support standards are utilized to mount the idler rollers it is necessary that the factory employees spend a considerable time in accurately adjusting the thrust bearings when the idler structure is assembled.

Another object of my invention is the provision of a resilient standard for supporting idler rollers which is so constructed that it will automatically and properly adjust the thrust bearings associated with said idler rollers and will, therefore, substantially reduce the factory assembly time customarily involved in bearing adjustment.

A further object of my invention is the provision of a spring standard for supporting the idler rollers of an idler assembly and for automatically maintaining the bearings associated with said idler rollers in seating relationship therewith which achieves said automatic adjustment by exerting a lateral thrust against the bearings, thus causing them to seat more effectively upon the idler rollers.

An additional object of my invention is the provision of spring standards for supporting idler rollers and the bearings associated therewith in a condition of optimum adjustment which are of such reduced cross-sectional area that the distance between the contiguous ends of adjacent rollers may be substantially reduced to prevent the pinching of the conveyor belt supported thereupon between the ends of said rollers.

A further object of my invention is the provision of spring standards adapted to support a plurality of idler rollers in contiguity to each other, said standards having the upper ends thereof so formed as to prevent the depositing of contaminating materials in the ends of the idler rollers.

Another object of my invention is the provision of spring standards for supporting a plurality of idler rollers in contiguity to each other which may be easily and economically manufactured and can be readily assembled.

A further object of my invention is the provision of a spring standard for supporting the idler rollers of an idler assembly and for automatically maintaining the bearings associated with said idler rollers in seating relationship therewith which achieves said automatic adjustment by exerting a lateral thrust against the bearings, thus causing them to seat more effectively upon the idler rollers.

An additional object of my invention is the provision of spring standards for supporting idler rollers and the bearings associated therewith in a condition of optimum adjustment which are of such reduced cross-sectional area that the distance between the contiguous ends of adjacent rollers may be substantially reduced to prevent the pinching of the conveyor belt supported thereupon between the ends of said rollers.

A further object of my invention is the provision of spring standards adapted to support a plurality of idler rollers in contiguity to each other, said standards having the upper end thereof so formed as to prevent the depositing of contaminating materials in the ends of the idler rollers.

Another object of my invention is the provision of spring standards for supporting a plurality of idler rollers in contiguity to each other which may be easily and economically manufactured and can be readily assembled.

Other objects and advantages of my invention will become apparent from a perusal of the following specification and the accompanying drawings, which are for the purpose of illustration only, and in which:

Fig. 1 is a vertical, elevational view showing an idler assembly incorporating resilient standard means constructed in accordance with my invention;

Fig. 2 is an enlarged, fragmentary, partly elevational, partly sectional view;

Fig. 3 is a vertical, elevational view taken on the broken line 3—3 of Fig. 2;

Fig. 4 is a fragmentary, vertical, elevational view taken on broken line 4—4 of Fig. 2;

Fig. 5 is a fragmentary, vertical, elevational view taken on broken line 5—5 of Fig. 2;

Fig. 6 is a partly elevational, partly sectional view showing another embodiment of my invention;

Fig. 7 is a fragmentary, enlarged, longitudinal, sectional view taken on broken line 7—7 of Fig. 6; and Fig. 8 is a vertical elevational view taken on broken line 8—8 of Fig. 7.

Referring to the drawings, I show an idler assembly 10 which is adapted to support an elongated, flexible conveyor belt or load carrying member 11 in a predetermined configuration, such as the form of a trough, to permit the conveyor belt 11 to transport a load of material 12. The idler assembly 10 is supported upon metal base plates 14 through the medium of an elongated, transverse angle iron 16 which extends for substantially the width of the idler assembly 10 and is adapted to properly orient the respective component parts thereof in predetermined relationship to each other.

Supported upon the outer ends of the transverse angle iron 16 and fixedly attached thereto, as by welding, is a pair of spaced, outer spring standards 18 which are formed of a single piece 19 of spring stock or other material. The spring standards are inwardly inclined and the resilient material from which they are formed provides a lateral, inward thrust which is substantially axial of the members which the standards are designed to support, as will be described in greater detail below.

To prevent the weaving and excessive distortion of the spring standards 18 when a load is imposed thereupon, they are divided into lower, moderately inclined, rigid portions 20 which are rigidified by internal gussets 21 welded upon the inner faces thereof and to the top of the transverse angle iron 16 and upper, flexible portions 23. Thus, the rigidifying of the lower portions 20 of the spring standards 18 by the gussets 21 serves to prevent undue distortion of the spring standards 18. On spring standards designed for light application the gussets may be eliminated.

The upper, substantially flexible portions 23 of the standards 18 are bent inwardly from the tops of the lower, rigid portions 20 and provide the spring action which is characteristic of the standards 18 as a whole. The upper ends of the standards 18 terminate in arcuately shaped, inwardly deflected shield portions 25 which serve, to some extent, to deflect foreign matter dropping upon the idler assembly 10 and to prevent injury to the idler assembly by such foreign matter. Flats 26, whose function will be described in greater detail below, are provided in the upper portions 23 of the standards 18 and have formed therein rectangular openings 27. It will be noted that the flats 26 lie substantially intermediate the upper and lower ends of the upper portions of the standards 18.

Spaced inwardly from the outer spring standards 18 is a pair of intermediate spring standards 28 which are adapted to cooperate with the spring standards 18 in a manner which will be described in greater detail below. The standards 28 are provided with inverted V-shaped bases 29 which conform to the outer configuration of the transverse angle iron 16 and which are provided in the opposite legs thereof with longitudinal slots 31 adapted to permit lateral adjustment of the intermediate spring standards 28 with reference to the transverse angle iron 16 and the outer spring standards 18. A plurality of bolt and nut combinations 32 which are mounted in the transverse angle iron 16 are positioned in the longitudinal slots 31 and serve to hold the bases 29 of the intermediate spring standards 28 in predetermined positions of adjustment.

The slots 31 in the intermediate spring standards provide for the easy assembly of the troughing rolls between the outer and intermediate standards even though the outer standards are welded to the angle iron. The manner of assembling the component parts will be described in greater detail below.

The intermediate spring standards 28 are formed of single pieces 33 of spring stock and are divided into vertical, substantially rigid, lower portions 34 which are rigidified by gussets 35 and into substantially resilient upper portions 36 which are formed in the shape of inverted U's and which have upwardly inclined legs 38 connected by the base of the U to depending legs 39. The upwardly inclined legs 38 and depending legs 39 are respectively provided with oppositely disposed rectangular openings 41 and 42. It will be noted that the axes of inclination of the legs 38 of the upper resilient portions 36 of the intermediate spring standards 28 are substantially parallel to the axes of inclination of the flats 26 formed intermediate the ends of the upper portions 23 of the outer spring standards 18. The axes of inclination of the legs 38 and the flats 26 on opposite sides of the idler assembly are so directed that they will ultimately intersect. It should also be noted that the openings 27 formed in the flats 26 and the openings 41 formed in the inclined legs 38 are coaxial and adapted to support a member therebetween on an inclined axis.

Of moment also is the fact that the vertical axes of the depending legs 39 are substantially parallel to the vertical axes of the lower rigid portions 34 of the intermediate spring standards 28 and the openings 42 are mutually coaxial and adapted to support a member therebetween on a horizontal axis.

Disposed on inclined axes between the outer spring standards 18 and the intermediate spring standards 28 are outer cylindrical rollers 44 which are adapted to act as rotatable load-bearing members and which are mounted upon hollow shaft means 45. The shaft means 45 are provided with outer rectangular ends 46 which fit into the rectangular openings 27 in the flats 26 of the outer spring standards 18 and inner rectangular ends 47 which fit into the rectangular openings 41 in the upwardly and inwardly inclined legs 38 of the upper portions 36 of the intermediate spring standards 28.

The insertion of the rectangular outer and inner ends 46 and 47 of the shaft means 45 into the rectangular openings 27 and 41 in the outer spring standards 18 and the intermediate spring standards 28 serves to key the shaft means 45 against rotation in reference to the standards 18 and 28 and permits the outer cylindrical rollers 44 to revolve relative to the shaft means 45.

The rollers 44 are hollow and have concave end portions 49 which provide indented, cylindrical bearing seats 50 connected by integral tubular portions 51. The shaft means 45 are adapted to be inserted through the bearing seats 50 and the integral tubular portions 51 of the rollers 44.

Seated in the cylindrical bearing seats 50 formed in the concave ends 49 of the rollers 44 are roller thrust bearings 52, the outer races 53 of which impinge against the bottoms and sides of the bearing seats 50 and the inner races 55 of which are mounted upon the shaft means 45 and separated from the outer races 53 by means of bearing rollers 54. Seal means 57 serve to prevent the leakage of lubricant from the interior of the thrust bearings 52.

When such thrust bearings are utilized in the construction of idler assemblies in which the rollers are supported upon rigid standards, it is necessary to provide threaded or similar adjustment means to initially adjust the inner race of the thrust bearings with reference to the outer race thereof in order that all slop and play may be eliminated and in order that maximum efficiency of bearing action may be attained. As indicated previously, the adjustment of such bearings is a time consuming task and must be properly performed in order to assure maximum bearing life. However, all bearings of this type sooner or later get out of adjustment and when they do become maladjusted, the seal means 57 are frequently ruptured, permitting the leakage of lubricant from the bearings and causing the eventual failure of the bearings with resultant shut-down time necessary to replace the bearings that have failed.

In order to insure that the thrust bearings 52 will be kept in a state of optimum adjustment, thrust sleeves 59 are mounted upon the shaft means 45 and interposed between the inner races 55 of the bearings and the inner faces of the flats 26 of the upper portions 23 of the outer spring standards 18. The thrust sleeves 59 are provided with annular flanged portions 60 which permit the more effective seating of the ends of the sleeves 59 upon the flats 26 of the standards 18 and which also permit the lateral thrust of the spring standards 18 to be more effectively communicated to the inner races of the thrust bearings 52 to secure the maximum and optimum adjustment of the thrust bearings in the bearing seats 50 of the rollers 44. Grease fittings 61 which are adapted to supply lubricant to the thrust bearings 52 are provided in the ends of the shaft means 45 and suitable channels, not shown, are provided to permit the effective distribution of the lubricant thereto.

Disposed between the inclined outer rollers 44 and having its ends contiguous to the ends of said rollers, is an intermediate roller 63 which is positioned on a horizontal axis and supported upon a hollow shaft means 64, the rectangular ends 65 of which are non-rotatably positioned in the rectangular openings 42 provided by the depending, substantially vertical legs 39 of the intermediate standards 28. Supported in the bearing seats 50 in the intermediate roller are thrust bearings 52 identical to the thrust bearings of the outer rollers 44.

When the thrust bearings 52 are seated within the bearing seats 50 at the ends of the outer rollers 44 and the intermediate roller 63, the axially shiftable thrust sleeves 59 urge the inner races of the thrust bearings 52 into a position of optimum adjustment due to the lateral thrust exerted upon the thrust sleeves 59 by the action of the spring standards 18 and 28. More specifically, the inner faces of the flats 26 contact the flanged portions 60 of the thrust sleeves 59 and urge the inner ends of the thrust sleeves 59 into contact with the inner races 55 of the thrust bearings 52. The inner races 55 of the thrust bearings 52, through the medium of the rollers 54, force the outer races 53 into intimate contact with the bottoms and sides of the bearing seats 50 and prevent the relative rotation of the outer races 53 of the thrust bearings 52 with reference to the bottoms and sides of the bearing seats 50. In addition, the spring legs 38 of the intermediate spring standards 28 serve to hold the inner races 55 of the thrust bearings 52 in the seats 50 in a similar manner to that described above so that the thrust bearings 52 in both ends of the inclined rollers 44 are kept in a condition of optimum adjustment. It should be noted that the arrangement of the inclined axes of the flats 26 and the inclined legs 38 permits the accurate seating of the annular flanged portions 60 of the thrust sleeves 59 upon the inner faces of the flats 26 and the inclined legs 38 and prevents undesirable binding of the thrust sleeve 59 upon the shaft means 45, which would prevent the thrust sleeve 59 from maintaining the thrust bearings 52 in a condition of maximum adjustment.

The substantially vertical, depending legs 39 of the intermediate spring standards 28 tend to exert a lateral, axial thrust against the annular flanged portions of the thrust sleeves 59 and maintain the thrust bearings seated in the bearing seats 50 of the intermediate roller 63 in a condition of optimum adjustment. The arrangement of the vertical axes of the depending legs 39 of the intermediate standards 28 in substantial parallelism with the lower rigid portions of the standards 28, which are also substantially vertical, serves to maintain the intermediate roller 63 in a substantially horizontal condition at all times and the minute lateral deflection of the depending legs 39 which results in the optimum adjustment of the thrust bearings 52 is not sufficient to disturb the horizontal disposition of the intermediate roller 63. The inverted U-shape of the upper portions 36 of the intermediate standards 28 permits the respective ends of the inclined rollers 44 and the intermediate roller 63 to be resiliently supported upon a single standard. The minimal cross-sectional area of the spring stock from which the standard is formed permits the ends to be brought closer together than would ordinarily be possible with the use of conventional rigid standards, thus eliminating the possibility that the conveyor belt 11 may be pinched between the contiguous ends of the outer rollers 44 and the intermediate roller 63.

The utility of the slots 31 in the intermediate standards in the assembly of the apparatus is important. One inclined roller is first mounted between an outer and intermediate standard with the bolts loose in the slots. Then the intermediate roller is mounted between the intermediate standards. When the other inclined roller is mounted, the other rolls can be shifted against the other outer standard so that a space equivalent to the deflection of both outer standards is provided to facilitate the mounting of the inclined roller in place. When the standards are released the bearings are automatically subjected to the same pressure and the assembly is simply finished by tightening up the bolts in the slotted holes.

An alternative embodiment of my invention is shown in Figs. 6 through 8 of the drawings and, although only a portion of the idler assembly in which my invention is embodied is shown, it will be understood that the assembly includes a pair of outer inclined rollers and an intermediate horizontal roller. An outer standard 70 is supported upon a transverse angle iron 71 and has a lower substantially rigid portion 72 which supports a flexible, substantially resilient, upper portion 73. Provided in the flexible upper portion 73 of the outer standard 70 is an annular opening 74 into which is pressed a cylindrical hub member 75 having an annular flanged portion 76 formed on one end thereof which is adapted to impinge upon the inner face of the upper flexible portion 73 of the outer standard 70 about the region of the opening 74.

An intermediate spring standard 77 having a lower, substantially rigid portion 78 suitably affixed to the transverse angle iron 71 has an upper, substantially resilient portion 79 which is provided with an annular opening 80 adapted to maintain a cylindrical hub 81 which has been pressed thereinto and which is provided at one end thereof with an annular flange 82 adapted to seat against a face of the intermediate spring standard 77.

The hub members 75 and 81 are provided with longitudinal, cylindrical bores 84 adapted to receive the cylindrical shanks 85 of shaft means 86. Set screws 88 are provided in the hub members 75 and 81 and are adapted to be driven into contact with the peripheries of the shanks 85 of the shaft means 86 to prevent rotational movement of the shaft means 86 with reference to the longitudinal bores 84 of the hub members 75 and 81. An inclined roller 89 is supported on an inclined axis between the outer spring standard 70 and the intermediate spring standard 77 and has concave ends 90 which are provided with cylindrical bearing seats 91. Pressed into the bearing seats 91 and adapted to permit the rotation of the inclined roller 89 with reference to the shaft means 86 are ball bearings 92 which comprise outer races 93 which contact the bottom and wall portions of the bearing seats 91 and inner races 95 which encompass the ends of the shaft means 86. Balls 94 interposed between the outer races 93 and the inner races 95 permit the rotation of the races with reference to each other and also permit the rotation of the inclined roller 89 with reference to the ends of the shaft means 86.

The inner races 95 of the ball bearings 92 encompass hexagonal ends 97 of the shaft means 86 and provide mating hexagonal seats 96 which are adapted to receive said hexagonal ends. The ball bearings 92 are provided with grease seals 99 which are adapted to retain a predetermined supply of lubricant within the bearings and which serve to prevent the leakage of lubricant therefrom during the life of the bearings. Bearing caps 101 seal the outer ends of the bearings 92.

The hexagonal ends 97 of the shaft means 86 when seated within the hexagonal seats 96 provided by the inner races 95 of the ball bearings 92 serve to prevent the rotation of the inner races 92 in reference to the shaft means 86 and also permit the bearings to assume a variety of angles divergent from the longitudinal axes of the shaft means 86 to insure that the bearings 92 are properly seated within the bearing seats 91 in the ends of the inclined roller 89. However, the roller 89 is subjected to continual and considerable vibration when in use and the hexagonal ends of the shaft means 86 and the hexagonal seats of the bearings 92 become somewhat worn. When such wear occurs, the rotation of the hexagonal seats 96 in reference to the hexagonal ends 97 takes place and chattering and dislocation of the bearings 92 may take place. In order to prevent the relative rotation between the inner races and the hexagonal ends of the shaft means 86, it is desirable to provide an axial force which will hold the hexagonal ends 97 of the shaft means 86 in intimate contact with the hexagonal seats 96 of the bearings 92 and which will also hold the outer races 93 of the bearings 92 in continuous and accurate seating relationship with the sides and bottom portions of the seats 91 of the roller 89.

The lateral and axial thrust transmitted into the shaft means 86 from the upper resilient portions 73 and 79 of the outer and intermediate spring standards 70 and 77 respectively through the hub members 75 and 81 mounted therein serves to drive the hexagonal ends 97 of the shaft means 86 into intimate seating contact with the hexagonal seats 96 of the bearings 92. In this manner the wear induced in the hexagonal seats and ends of the shaft is reduced to a minimum.

Such wear is caused by looseness between the shaft 97 and the seats 96, which permits vibration to cause a slight chattering. The damage that can be caused by vibration is done by the turning of the inner race on the pin after the hexagonal faces have worn away due to such vibration. For instance, on a cold morning, the extra friction in the ball bearing, due to the stiffness of the grease, will cause the inner race to turn on the pin and finally wear it off, causing the roller to drop down and hit the standard whereupon a hole would probably be worn in the belt.

Although I have shown and described specific embodiments of my invention for the purpose of illustrating the manner of construction and mode of operation thereof, it is obvious that changes, alterations and modifications may be made in the details shown and I do not intend to be limited to these specific details but intend, rather, to be afforded the full scope of the patent claims.

I claim as my invention:

1. In combination: a shaft; a rotatable load-bearing member mounted upon said shaft; a bearing element interposed between said shaft and said member; and inwardly biased spring support means including leaf spring means engaging and supporting an end of said shaft, the inward bias of said support means being toward an adjacent end of said rotatable load-bearing member.

2. In combination: a shaft; a rotatable load-bearing member mounted upon said shaft; a bearing element interposed between said shaft and said member; spring support means including leaf spring means engaging and supporting an end of said shaft; and a sleeve mounted upon said shaft between said bearing element and said spring support means and being adapted to transmit the lateral thrust of said spring support means into said bearing element.

3. In combination: a rotatable, load-bearing member; a non-rotatable shaft means upon which said rotatable member is mounted; a bearing element interposed between said shaft and said rotatable member; spring support means including leaf spring means engaging and supporting an end of said shaft and holding it against rotation; and an axially shiftable sleeve mounted upon said non-rotatable shaft between said bearing element and said spring support means adapted to transmit the lateral thrust of said spring support means to said bearing element.

4. A supporting structure for a rotatable, load-bearing member, including in combination: shaft means for mounting said rotatable member; bearing means interposed between said shaft means and said rotatable member at opposite ends thereof; and spaced, inwardly biased, spring support means engaging the ends of said shaft means, the inward bias of said spring support means being toward an adjacent end of said rotatable member.

5. A supporting structure for a rotatable, load-bearing member including, in combination: shaft means mounting said rotatable member; bearing means interposed between said shaft means and said rotatable member at opposite ends thereof; spaced, spring support means engaging the ends of said shaft means; and sleeve means mounted upon the opposite ends of said shaft means between said bearing means and said spring support means adapted to transmit the lateral thrust of said spring support means to said bearing means.

6. A supporting structure for a rotatable, load-bearing member including, in combination: shaft means mounting said rotatable member; bearing means interposed between said shaft means and said rotatable member at opposite ends thereof; spaced, spring support means engaging the ends of said shaft means, said spring support means having substantially rigid lower portions and substantially flexible upper portions; and axially shiftable means on said shaft means interposed between said flexible upper portions and said bearing means to maintain said bearing means in optimum adjustment.

7. In an idler structure adapted to support a load-carrying member, the combination of: a plurality of spaced rotatable elements whose ends are juxtaposed to one another; a plurality of shafts each adapted to support one of said rotatable elements in cooperative relationship with the other rotatable element to sustain said load-carrying member, bearing means interposed between said shafts and the ends of said rotatable elements; a plurality of spaced, spring standards engaging the ends of said shafts and axially shiftable members on said shafts interposed between said standards and said bearing means for transmitting the lateral bias of said standards to maintain said bearing means in optimum adjustment, said spring standards including at least one spring standard disposed between the inner ends of said shafts for simultaneously supporting said inner ends and two outer spring standards for supporting the outer ends of said shafts.

8. A standard adapted to support a rotatable, shaft-mounted, load-bearing member including a lower, substantially rigid, base portion and an upper, inwardly biased, substantially resilient, shaft-engaging leaf-spring portion, the inward bias of said upper portion being toward the adjacent end of said load-bearing member.

9. A standard adapted to support the juxtaposed ends of two shafts which each mount a rotatable, load-bearing member in cooperative relationship by axially adjustable bearing means interposed between said shafts and said members including a lower, base portion and an upper, substantially resilient portion providing oppositely biased segments with oppositely disposed openings adapted to receive the ends of said shafts, said segments engaging axially shiftable means on said ends of said shafts for maintaining said bearing means in optimum adjustment.

10. A standard adapted to support the juxtaposed ends of two shafts which each mount a rotatable, load-bearing member in cooperative relationship by axially adjustable bearing means interposed between said shafts and said members including a lower base portion and an upper, substantially resilient, U-shaped portion having oppositely biased segments with oppositely disposed shaft-receiving openings formed therein, said segments engaging axially shiftable means on said ends of said shafts for maintaining said bearing means in optimum adjustment.

11. In an idler structure adapted to support a load-carrying member, the combination of: a plurality of rotatable elements having contiguously disposed ends; a plurality of shafts each adapted to mount one of said rotatable elements in cooperative relationship to permit said elements to sustain said load-carrying member; adjustable bearing means interposed between each of said shafts and its associated rotatable element; axially shiftable adjustment means engaging said bearing means; and a plurality of spaced, elongated, spring standards having portions supporting the ends of said shafts which are inwardly biased toward the ends of said rotatable elements and urge said adjustment means into engagement with said bearing means.

12. In an idler structure adapted to support a load-carrying member, the combination of: a plurality of rotatable elements having contiguously disposed ends, at least the outer two of said rotatable elements being disposed on inclined axes and at least one intermediate rotatable element being horizontally disposed between the ends of said inclined rotatable elements; shaft means adapted to mount said rotatable elements; bearing means interposed between said shaft means and said rotatable elements; and a plurality of elongated spring standards having portions supporting the ends of said shaft means, said portions being inwardly biased toward the ends of said rotatable elements to adjust said bearing means in said rotatable elements.

13. In an idler structure adapted to support a load-carrying member, the combination of: a plurality of rotatable elements having contiguously disposed ends, the outer two of said rotatable elements being disposed on inclined axes and at least one intermediate rotatable element being horizontally disposed between the ends of said inclined rotatable elements; shaft means adapted to mount said rotatable elements; bearing means interposed between said shaft means and said rotatable elements; and a plurality of elongated spring standards supporting the ends of said shafts, said standards including a spaced pair of standards adapted to support the outer ends of said outer inclined rotatable elements and at least a pair of intermediate standards adapted to support the inner ends of said outer elements and the opposite ends respectively of at least one intermediate rotatable element, each intermediate standard having a resilient upper portion of U-shaped configuration providing oppositely disposed openings adapted to receive the ends of contiguously disposed shaft means, the upper ends of said spaced pair of standards having inwardly biased portions and the upper portions of said intermediate standards having oppositely biased segments adapted to maintain said bearing means in a condition of optimum adjustment.

14. An apparatus for adjustably supporting a bearing in seating relation with a rotatable load-bearing member, including: an elongated, spring standard having a shaft-receiving opening formed therein; and a shaft having one end mounted in said opening and its other end seated in said bearing and being adapted to transmit the lateral thrust of said spring standard to said bearing to hold it in adjustment with said shaft.

15. An apparatus for adjustably supporting a bearing in seated relation with a rotatable load-bearing member, including: an elongated, leaf spring standard having a shaft-receiving opening formed therein; a shaft having one end mounted in said opening; and an axially shiftable sleeve mounted upon said shaft and interposed between said bearing and said spring standard adapted to transmit the lateral thrust of said spring standard to said bearing to hold said bearing in adjustment in said rotatable member.

16. An apparatus for adjustably supporting a bearing in seating relation with a rotatable load bearing member, including: an elongated spring standard having an inwardly biased upper end, the inward bias of said upper end being in the direction of the adjacent end of said load bearing member, said upper end having an opening formed therein; a mounting sleeve secured in said opening; and a shaft having one end mounted in said sleeve and its other end seated in said bearing and being adapted to transmit the lateral thrust of said spring standard to said bearing to hold it in adjustment with said shaft.

References Cited in the file of this patent

UNITED STATES PATENTS

| Number | Name | Date |
| --- | --- | --- |
| 801,521 | Haas | Oct. 10, 1905 |
| 1,111,474 | Lenfestey | Sept. 22, 1914 |
| 1,266,363 | Wentz | May 14, 1918 |
| 1,518,413 | Ross | Dec. 9, 1924 |
| 1,742,453 | Van Derhoef | Jan. 7, 1930 |
| 1,793,190 | Philips | Feb. 17, 1931 |
| 1,931,998 | Skillman | Oct. 24, 1933 |
| 1,949,817 | Stonefield | Mar. 6, 1934 |

FOREIGN PATENTS

| Number | Country | Date |
| --- | --- | --- |
| 569,706 | France | Apr. 16, 1924 |